Nov. 29, 1960     J. P. HEISS     2,962,280
CALIBRATED ORIFICE FOR HIGH PRESSURE STRUTS
Filed Feb. 12, 1958
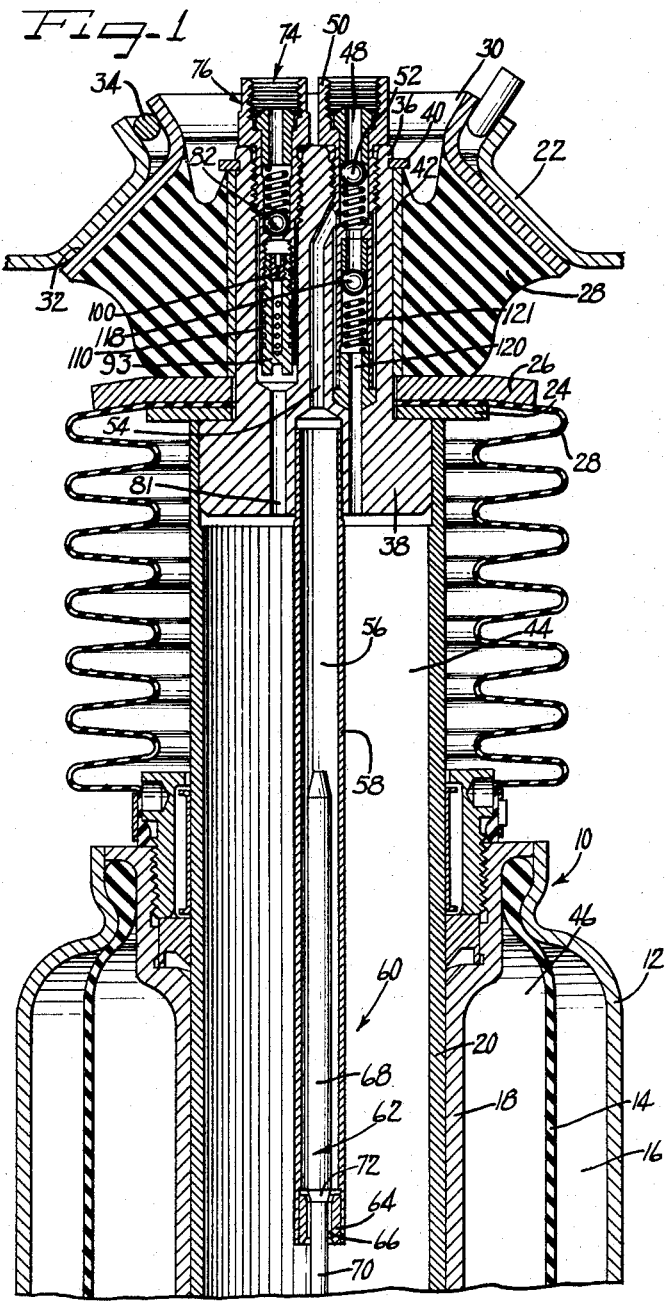
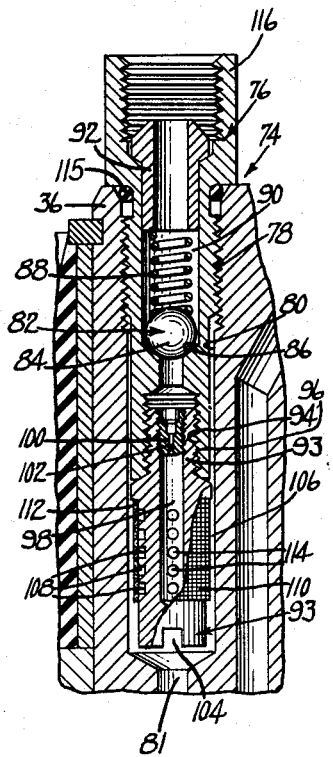
Inventor
John P. Heiss

2,962,280

CALIBRATED ORIFICE FOR HIGH PRESSURE STRUTS

John P. Heiss, Flint, Mich., assignor to Thompson Ramo Wooldridge Inc., a corporation of Ohio Filed Feb. 12, 1958, Ser. No. 714,867

4 Claims. (Cl. 267—64)

The present invention relates to improvements in automatic leveling hydro-pneumatic suspension devices for vehicles, and in particular to a flow system for an automatic leveling suspension strut capable of accommodating the flow problems encountered by a hydraulic liquid in a self-leveling suspension strut.

In a suspension system for a vehicle employing resilient pneumatic struts with self-leveling provisions, a pressurized supply of liquid may be utilized to control the expansion of a chamber in a resilient strut for the self-leveling feature. In certain of these mechanisms, a constant flow of hydraulic liquid is employed with a flow controlling valve that establishes the extension length of the strut to maintain the vehicle level with variations in load. In these systems, a flow controlling orifice is employed which limits the flow from an expansible chamber with a variable control valve regulating the flow into the chamber, thereby determining the quantity of liquid within the chamber to determine its expansion length. To effectively continue operation of such a system, the escape orifice size is critical, and must be maintained constant. Particles of foreign material which would block the orifice, must be kept from the system, and in the present invention this is done expeditiously by the provision of an improved filtering assembly which solves the problems encountered in a mechanism of the type described.

An embodiment of the invention may take the form, as illustrated in the drawings, of a liquid flow control unit for controlling the escape of hydraulic liquid from the chamber of a self-leveling, expansible strut. The strut is provided with an escape conduit leading from the expansible chamber which is internally threaded to accommodate a removable tubular-shaped, elongated carrier member. The carrier member has an internal passageway extending therethrough of a size to accommodate a check valve which opens in a downstream direction. Upstream of the check valve, the carrier member is internally threaded to receive an elongated, tubular-shaped filter body, which is externally threaded on its downstream end to be removably secured in the end of the carrier member, whereby the entire unit may be removed from the strut. The filter body is tubular in shape and of a diameter to fit into the cylindrical passageway leading from the strut. The filter body has an orifice defining member removably inserted into the downstream end of a hollow chamber within the body. Annular grooves, which are axially spaced, are located along the external surface of the filter body, and a tubular wrap-around perforated filter extends snugly over the outer surface of the filter body to cover the annular grooves. Individual flow passageways communicate between the chamber within the filter body and the annular grooves with the flow path provided by the grooves and passageways being of a cross-sectional area substantially larger than the flow control orifice.

Accordingly, an object of the invention is to provide an improved mechanism of the type above-described, wherein a continual flow of hydraulic liquid will be filtered to remove foreign particles therefrom to prevent blocking of an escape orifice, and insure continued, successful operation of a pneumatic, liquid-controlled, self-leveling, resilient support strut.

Another object of the invention is to provide an improved filtering mechanism which meets the problems encountered with shock variations in flow in a hydropneumatic support strut.

A further object of the invention is to provide an improved combined filter unit and flow-limiting orifice assembly which may be removed as a unit from a hydropneumatic support strut for cleaning and servicing.

Another object of the invention is to provide an improved filter assembly which avoids disadvantages heretofore encountered.

Other objects and advantages will become more apparent with the teachings of the principles of the invention and the disclosure of the preferred embodiment thereof, in the specification, claims and drawings, in which:

Figure 1 is a vertical sectional view taken through a hydro-pneumatic self-leveling, resilient support strut embodying the principles of the present invention; and, Figure 2 is an enlarged detailed sectional view illustrating the flow-control orifice and filtering assembly of the invention.

As shown in the drawings:

Figure 1 illustrates a strut assembly 10 for supporting the frame of a vehicle from a wheel and axle. Normally, one of the units, such as shown at 10, will be placed on each of the corners of the frame for a resilient support thereof, and for self-leveling of the vehicle for changes of load on the frame.

The strut 10 employs an outer shell 12 with a resilient bladder 14, located therein in a coaxial location and spaced inwardly from the shell to define an air chamber 16 therebetween. This air chamber affords the resilience of the strut for spring-like support of a vehicle.

Expansion and contraction of the strut for the resilient support and for the self-leveling feature is afforded by a tubular cylinder 18, which slidably receives a tubular piston 20. The outer cylinder 18 is secured to the shell 12, and the slidable piston is free for vertical sliding movement relative thereto. The shell will be suitably connected to the axle of a vehicle, while the piston will be suitably connected to a frame portion 22.

At the upper end of a piston 20 is secured an annular washer 24, upon which rests another annular washer 26 with a piston protecting bellows 28 having its upper end clamped therebetween. On top of the upper washer 26 rests an annular rubber collar 28 having a frusto-conical shaped metal shell 30 on top of the washer. The metal shell 30 receives the frame portion 22 on its upwardly facing sloping surface 32, and the frame is locked to the frusto-conical collar by a locking ring 34.

Sealing the upper end of the hollow piston 20 is a cylindrical metal block 36 which has flow passageways bored therethrough. The block has an enlarged lower end 38 extending beneath the washer 24 to lock it in place at the top of the piston, and the block 36 is further locked by a snap ring 40, snapping into a groove at its upper end, and positioned above a metal sleeve 42 on the inside of the rubber collar 28.

Within the piston 20 is a liquid chamber 44, and the liquid within the chamber communicates with a chamber 46 outside of the cylinder 18 by passageways, not shown, beneath the lower end of the cylinder 18. The non-compressible liquid within the chamber 44 thus presses against the bladder 14, and the resiliency of the air in the chamber 16 is transmitted to the piston 20 which carries the frame 22 of the vehicle.

The quantity of the liquid pumped into the chamber 44 within the piston will determine the height of the piston, and this quantity will be increased or decreased depending upon the amount of compression of the air within the chamber 16 with the load upon the frame 22 of the vehicle.

Leveling liquid is delivered to the chamber through a passageway 48 in a fitting 50 threaded into the top of the block 36. The liquid continues to flow downwardly past a check valve 52 through a passageway 54 communicating with the elongated interior flow chamber 56 of a flow accommodating outer tubular member 58 of a needle valve assembly 60.

The needle valve assembly 60 has movable core 62 which telescopically slides within the chamber 56 of the valve member 58. The flow accommodating valve 58 has an annular wall insert 64 at the end defining a flow orifice 66. The valve core 62 has an enlarged end portion 68 and a reduced portion 70 with the portions joining each other by a tapered section 72.

The liquid accommodating valve portion 58 is attached to move with the piston 20, and the core 62 moves with the cylinder 18 so that as the strut expands or contracts, either the large portion 68 of the valve core or the reduced portion 70 will move into the orifice 66, thereby determining the quantity of flow into the chamber 44.

It will be observed that if flow from the chamber is limited, the strut will remain at an extended length to maintain the valve parts 58 and 62 in the relative positions shown, since compression of the strut will increase the flow into the chamber 44, and extension will decrease the flow.

A flow restricting assembly is illustrated at 74, and is shown in detail in Figure 2. The assembly includes an elongated tubular shaped carrier member 76 having external threads 78 to be threaded into an elongated cylindrically shaped conduit 80 extending from the outer end of the block 36, and having a smaller extension 81 communicating with the chamber 44 within the piston.

Within a passageway extending completely through the carrier 76 is located a ball check valve 82 having a ball member 84 held against a seat 86 by a coil compression spring 88. The check valve compression spring is held within a check valve chamber 90 by a spring retaining annular sleeve 92.

Upstream of the check valve 82, the carrier member 76 has internal threads 94 to receive the externally threaded reduced end 96 of a filter body 93.

The filter body 93 has an internal coaxial elongated flow chamber 98 which opens toward the downstream end of the filter body and is closed at the upstream end. Removably threaded into the downstream end of the chamber 98 is an orifice defining plug 100, having a flow restricting orifice 102 extending therethrough. The orifice 102 limits the flow from the piston chamber 44, in order that the amount of liquid in the chamber will control the extension of the strut 10.

The filter body 93 is an elongated, cylindrically shaped bolt of substantially uniform diameter with the reduced end 96. The upper end contains a slot 104 to forcibly remove and attach the filter body 93 from the carrier member 76. The diameter of the filter body is such that it may be coaxially located within the conduit 80 to leave an annular flow path 106 between the body and the conduit wall for the liquid to reach the filter.

The outer surface of the filter body 93 has a plurality of annularly extending axially spaced grooves 108. Surrounding the outer surface of the filter body and covering the areas of these grooves is a filter material 110 which is tubular in shape, and is of a length and diameter to snugly fit over the outer surface of the filter body and cover the annular grooves. The downstream portion of the filter body is slightly enlarged to provide an annular shoulder 112 for preventing movement of the filter screen 110 in a downstream direction.

To permit flow from the annular grooves 108 into the chamber 98 within the filter body, a plurality of individual flow ports 114 extend radially between the grooves 108 and the chamber 98. These grooves may be conveniently drilled in a radial direction, or from a radial direction to extend completely through the filter body.

The flow area of the orifice 102 is smaller than the maximum flow area of the orifice 66 through the needle valve assembly to maintain liquid pressure within the piston chamber 44. Also, the cross-sectional flow area afforded by the ports 114 and the annular recesses 108 are substantially larger than the flow restricting orifice 102, and the area afforded by the annular grooves obtains considerable filter area to obtain a free flow of liquid to the orifice.

The entire filter and orifice assembly may be removed by simply screwing out the carrier 76 from the block 36. A sealing ring 115 may be provided between the upper enlarged end 116 of the carrier member and the block 36.

In operation of the mechanism, a continual pressurized supply of liquid is directed into the chamber 44 within the piston 20 through the passageway 54. A normal flow of liquid will flow through the check valve 52, but check valve 118 will remain closed. Check valve 118 is positioned in the flow passageway 120 leading directly to the chamber 44, and is backed with a spring 121 of sufficient strength to normally maintain the check valve 118 closed.

The strut 10 is maintained at a constant level extension by the needle valve 60. The core 62 of the needle valve and the flow accommodating member 58 of the valve move telescopically so that flow through the orifice 66 of the needle valve will be regulated by either the enlarged portion 68 or the reduced portion 70 of the core moving into the orifice. Escape of liquid from the chamber 44 is regulated by the flow restricting orifice 102. All of the liquid leaving the chamber 44 is filtered by flowing through the filter screen 110 into the annular grooves 108, through the ports 114, and into the chamber 98 within the filter body before entering the flow restricting orifice 102. The liquid then leaves the strut assembly past the check valve 82 to return to a sump for a pump.

Thus, it will be seen that I have provided an improved hydro-pneumatic resilient support and leveling strut which meets the objectives and advantages hereinbefore set forth. The filter system provided is capable of accommodating the problems involved in shock flow of liquid, such as will be caused when a vehicle provided with the strut encounters road shocks. Foreign particles will be continually and effectively filtered from the system to maintain the orifice open and at a constant critical size.

The assembly is uncomplicated in construction and can be readily disassembled for cleaning and maintenance.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. A constant flow hydro-pneumatic resilient suspension and leveling assembly comprising in combination a compressible strut member provided with a hollow chamber slidably receiving a piston, means defining an air chamber exposed to said hollow chamber, means for delivering a constant flow of hydraulic liquid to said hollow chamber including a control valve having an orifice defining member and a needle reciprocating therein with the orifice defining member connected to part of the strut and the needle connected to another part of the strut to vary flow with compression of the strut, means defining a liquid escape conduit leading from said chamber, a flow restricting orifice in said escape conduit, a filtering device upstream of said flow restricting orifice, a check valve downstream of said flow restricting orifice, said filtering device including a cylindrical filter body being coaxially located within said conduit and having a plurality of annular grooves surrounding the body with an axial bore extending into the body from the downstream end and with ports communicating with the bore and with said annular grooves, and a tubular shaped filter screen tightly wrapped around said filter body to cover said annular grooves whereby the liquid is filtered before it reaches said orifice.

2. A high pressure flow control assembly for accommodating shock fluctuations in hydraulic liquid such as may occur in a liquid resilient vehicle support strut comprising in combination means defining a liquid flow passageway, a carrier member being tubular in form with a flow conduit therethrough and provided with external mounting threads threaded into said passageway means, a check valve located in said carrier member and opening in a downstream direction, a threaded socket on the upstream end of said carrier member opening to said check valve, an elongated tubular shaped filter body carrying external threads on the downstream end threaded into said carrier member and telescopically extending into the passageway with flow clearance between the filter body and passageway, a chamber defined within the filter body for accommodating a flow of hydraulic liquid, a flow restricting orifice member removably positioned in the end of the filter body and having an orifice therethrough communicating with the chamber within the filter body and leading to said check valve, a plurality of annularly disposed axially spaced recesses in the surface of said filter body, passageway means communicating between the chamber within said filter body and said recesses, and a tubular shaped elongated filter screen extending over said filter body and covering the entire area of said recesses whereby hydraulic liquid flowing in the downstream direction will flow through said filter and into said chamber to be limited by said orifice and pass through the check valve and whereby the entire filter assembly is mounted on said carrier member.

3. An assembly for affording constant flow liquid leveling for a pneumatic suspension strut for a vehicle comprising in combination a strut including an elongated cylinder with a piston slidably received therein and a chamber defined between said piston and cylinder, means for supplying a flow of pressurized leveling hydraulic liquid to said chamber to maintain the chamber at a constant size including a control valve assembly with an orifice defining member and a needle valve of varying diameter and movable relative to said orifice defining member to regulate the flow into said chamber for regulating the elongation of said strut, said needle valve having a core member movable relative to said orifice member between a first position for maximum flow area and a second position for minimum flow area, means defining a liquid escape conduit from said chamber, a flow limiting orifice member in said escape conduit having an orifice therethrough a cross-sectional area greater than the flow area of said needle valve at minimum flow position, a filtering assembly upstream of said orifice member having an internal chamber communicating with said orifice, an outer surface on said filter assembly having a plurality of flow recesses therein communicating with the chamber within the filter, and a perforated filter member extending over said recesses whereby liquid escaping through said orifice must pass through the filter material, said recesses having a larger cross-sectional flow area than said orifice.

4. A constant flow hydro-pneumatic vehicle leveling and spring support strut assembly including an extensible strut having a piston member and a cylinder member slidably receiving the piston and defining a liquid chamber with the quantity of liquid in said chamber controlling the length of the strut, an inlet passageway connected to said chamber, means for supplying liquid under pressure to said passageway, means defining an outlet passageway from said chamber, a flow restricting orifice in said outlet passageway, a metering valve in said inlet passageway including a valve member having a valve orifice therein and another valve member having a core of varying diameter extending into said orifice, one of said valve members connected to said piston and the other of said valve members connected to said cylinder to decrease flow to said valve with increase in strut length and increase flow with decrease in strut length whereby a vehicle supported by the strut is held at a constant level, and a filter positioned between said valve and said flow restricting orifice so that all of the liquid is filtered before reaching the orifice to prevent blocking and varying the rate of escape of liquid from the chamber.

References Cited in the file of this patent

UNITED STATES PATENTS

| | | |
|---|---|---|
| 732,871 | Lemp | July 7, 1903 |
| 1,742,690 | Chapman | Jan. 7, 1930 |
| 1,861,821 | Schaum | June 7, 1932 |
| 2,393,423 | Sekera | Jan. 22, 1946 |
| 2,622,872 | Wettstein | Dec. 23, 1952 |
| 2,639,194 | Wahlin | May 19, 1953 |
| 2,644,699 | Weiertz et al. | July 7, 1953 |
| 2,802,664 | Jackson | Aug. 13, 1957 |
| 2,868,226 | Griswold | Jan. 13, 1959 |